United States Patent [19]
Suzuki et al.

[11] Patent Number: 6,123,840
[45] Date of Patent: Sep. 26, 2000

[54] ORGANIC WASTE WATER TREATING APPARATUS HAVING TREATING LAYER AND AUXILIARY LAYER

[75] Inventors: Haruhiko Suzuki, Tsukuba; Takakazu Inoue, Ushiku; Atsushi Yamada, Tsukuba; Tetsuya Kimura, Inashiki-gun; Eiji Kono, Urayasu; Tatsuhiko Sekiguchi, Tsukuba, all of Japan

[73] Assignee: Sanyo Electric. Co., Ltd., Moriguchi, Japan

[21] Appl. No.: 09/073,129

[22] Filed: May 5, 1998

[30] Foreign Application Priority Data

| May 6, 1997 | [JP] | Japan | ............ 9-115917 |
| May 6, 1997 | [JP] | Japan | ............ 9-115918 |
| Oct. 24, 1997 | [JP] | Japan | ............ 9-293005 |
| Oct. 24, 1997 | [JP] | Japan | ............ 9-293006 |

[51] Int. Cl.$^7$ .................................................. C02F 3/04
[52] U.S. Cl. ........................... 210/151; 210/261; 210/617
[58] Field of Search .................... 210/150, 151, 210/255, 261, 262, 615, 617

[56] References Cited

U.S. PATENT DOCUMENTS

| 968,015 | 8/1910 | Wilkie | 210/151 |
| 2,366,917 | 1/1945 | Levine | 210/617 |
| 2,992,986 | 7/1961 | Ingram | 210/150 |
| 4,427,548 | 1/1984 | Quick, Jr. | 210/150 |
| 4,465,594 | 8/1984 | Laak | 210/151 |
| 4,806,148 | 2/1989 | Ottengraf | 210/151 |
| 4,995,969 | 2/1991 | La Vigne | 210/150 |
| 5,049,265 | 9/1991 | Boyd et al. | 210/150 |
| 5,679,252 | 10/1997 | Gotou et al. | 210/617 |
| 5,707,573 | 1/1998 | Jowett et al. | 210/150 |

FOREIGN PATENT DOCUMENTS

| 6182317 | 7/1994 | Japan . |
| 9001117 | 1/1997 | Japan . |

OTHER PUBLICATIONS

Suzuki, H. et al. "A Degradation System of Disposed Garbage with Cedar Chips," *1997 JSAM Acty 21 Project U-brecs: Abstracts of Most Recent Compost Studies* pp. 28–29 (Oct. 25, 1997).

Suzuki, H. et al. "A Degradation System of Disposed Garbage with Cedar Chips," Proceeding of the Eighth Annual Conference of the Japan Society of Waste Management Experts, vol. 1 pp. 321–323 (Oct. 10, 1997).

Yamada, A. et al. "A Degradation System of Disposed Garbage with Cedar Chips," Proceedings of the Thirty-Second Annual Conference of the Japan Society on Water Environment p. 234 (Mar. 14, 1998).

*Primary Examiner*—Christopher Upton
*Attorney, Agent, or Firm*—Pillsbury Madison & Sutro LLP

[57] ABSTRACT

A primary treating tank (10) comprises a filling layer (14) and a foam glass layer (16) below the filling layer (14). The foam glass layer (16) contains foam glass grains each of which is larger in a grain diameter than a wood chip of the filling layer (14) so that the foam glass layer (16) is superior in water passing ability to the filling layer (14). In this arrangement, a space ratio is larger with a lower layer. This arrangement promotes smooth downward shifting of primary treated water. A secondary treating tank (30) also has a laminating structure including a filling layer (34) and a form glass layer (36). As air is supplied to the foam glass layer (36), the filling layer (34) is kept in a preferable aerobic condition so that preferable aerobic biological treatment is carried out on the treated water supplied from the primary treating tank (10).

13 Claims, 9 Drawing Sheets

ORGANIC WASTE WATER TREATING APPARATUS HAVING TREATING LAYER AND AUXILIARY LAYER

BACKGROUND OF THE INVENTION

1. Field of the Invention

The present invention generally relates to an organic waste water treating apparatus for treating waste water which contains organic material, such as crushed solid organic material, or waste water obtained by primary treating of such waste water.

2. Description of the Related Art

Conventionally, waste discharged from homes, including food waste, bottles, and the like, is collected separately and burnt at an incinerator. With this method, however, a problem arises in that a large amount of manpower is required to carry, collect, and treat the waste. In addition, burning is not desirable in light of recycling of resources and preservation of natural environments.

As a means for crushing food waste, a disposal unit is conventionally known. Crushing waste in a disposal unit and discharging the crushed waste with water is very convenient because the user of the disposal unit does not need to laboriously collect the waste. However, this causes a problem in that it may increase solid content and organic concentration in waste water, which may clog a sewage pipe and therefore impose a larger treating burden on a sewage treatment plant.

In light of the above, an apparatus has been proposed for treating crushed-organic-waste-containing waste water at home or in an apartment house. By using this apparatus, organic waste can be disposed of at respective homes without causing adverse effects on a sewage pipe and relevant equipment.

Such an apparatus is disclosed by, for instance, Japanese Patent Laid-open No. Hei 9-1117. In this apparatus, crushed-organic-waste-containing waste water is supplied to a solid treating section so that crushed waste is removed from the water through decomposition before being supplied to a waste water treating tank for aeration. With this arrangement, waste water which contains organic waste crushed by a disposal unit can be treated by an aerobic biological process.

In this apparatus, wood chips or the like are filled in the solid treating section and stirred by a paddle. This is basically an identical structure to that of a conventional compost-making apparatus for treating general organic waste.

The apparatus has a problem in that water tends to remain in the solid treating section under some operating condition because crushed-organic-waste-containing waste water discharged from a disposal unit usually contains more water than general organic waste does. The residual water may cause an anaerobic condition inside the apparatus.

Further, the filling material may easily stick together to form a lump when stirred by a paddle under moist conditions. This may impair the water passing ability.

Furthermore, although the apparatus employs a method basically identical to the activated sludge method, in which waste water is exposed to aeration treating using an air diffuser held in a waste water treating tank and aerated water is discharged therefrom, the apparatus is not equipped with a tank sufficiently large to store sediment of aeration mixture liquid. Therefore, this apparatus may not be capable of performing adequate treating when aeration mixture liquid has high suspended solid concentration (MLSS: Mixed Liquor Suspended Solid).

SUMMARY OF THE INVENTION

The present invention has been conceived to overcome the above problems, and aims to provide an organic waste water treating apparatus that can effectively treat solid-organic-material-contained waste water, such as waste water containing organic materials crushed by a disposal unit, or the like.

The present invention further aims to provide an organic waste water treating apparatus which can effectively treat primary treated water obtained by performing primary treatment with respect to organic waste water, such as waste water containing organic materials discharged from a disposal unit, or the like.

A waste water containing crushed organic material discharged from a disposal unit generally contains a relatively large amount of SS (suspended solid) and has a relatively high BOD (biochemical oxygen demand). In this invention, SS is removed by filtering the waste water through a filling layer, and dissolved organic material is removed through oxidation by microorganism carried by microorganism carriers to thereby lower the BOD.

The apparatus of this invention has an auxiliary layer, in addition to a filling layer (treating layer), so that treated water received from the filling layer is discharged via the auxiliary layer. An auxiliary layer may comprise different materials from that of the filling layer. Since permeated treated water can be discharged more smoothly via an auxiliary layer than directly via a filling layer, the present apparatus employing an auxiliary layer can solve the problem of treated water remaining in the filling layer and causing decay (anaerobic decomposition) and clogging. That is, this apparatus can remain capable of performing stable treating for a long time, using a filling layer. Moreover, if an auxiliary layer is made of a microorganism-holding material, dissolved organic material can be further removed, so that the BOD of the treated water discharged from this apparatus can be further lowered.

An auxiliary layer is formed adjacent to and below a filling layer so that it can receive treated water dropped from the filling layer due to gravitation and encourage smooth coming off of the waste water from the filling layer.

If an auxiliary layer is made of a water-passing and water-holding member, treated water can be more smoothly made to come off the filling layer and enter such an auxiliary layer. Moreover, since such an auxiliary layer can hold microorganisms, dissolved organic material can be further removed, so that the BOD is further lowered.

Treated water can more smoothly come off a filling layer to the outside when an auxiliary layer superior in water passing ability is provided and interposed between the filling layer and the outside. Specifically, although treated water does not easily come off directly from a filling layer with relatively low water passing ability (i.e., superior in water holding ability) due to surface tension of water, and thus may cause decay and clogging in the filling layer, it can smoothly come off the filling layer to the outside when an auxiliary layer is provided between the filling layer and the outside, creating an intermediate atmosphere therein.

It is possible to retain a predetermined water holding ability with an auxiliary layer when the auxiliary layer is made of a porous member. Note that a porous member mentioned here refers to a member whose surface or body are partly, preferably substantially, and more preferably entirely, porous.

Also, water passing ability, or the like, can be retained at a preferable level with an auxiliary layer when the auxiliary layer is made of a grain member.

Preferably, an auxiliary layer comprises grains of foam glass. Foam glass may be preferably used to form an auxiliary layer due to superior water passing ability (i.e., relatively low in water holding ability) compared to wood chips, or the like. Foam glass is also advantageous in that it can hold an appropriate amount of microorganisms without being clogged, so that residual organic material (particularly dissolved organic materials) in the treated water from the filling layer can be removed. As a result, the BOD is further lowered.

Preferably, microorganism carriers of a filling layer may comprise wood chips. Wood chips are inexpensive, porous, and superior in water absorbing property, and thus preferably used as microorganism carriers. A filling layer comprising wood chips may be able to hold a sufficient amount of aerobic microorganism to preferably decompose organic material.

Preferably, an auxiliary layer has a two-layer structure, in which a layer farther from the filling layer is superior in water passing ability to a layer closer to the filling layer. This arrangement can create a more gradually changing atmosphere between layers, and enables smoother discharging of permeated treated water to the outside.

With a two-layered auxiliary layer, the layer furthest from the filling layer preferably has a higher space ratio than the closer layer so that the former is superior in water passing ability to the latter. That is, water passing ability can be easily controlled by adjusting a space ratio of respective layers.

Smooth discharging of permeated treated water can be achieved by setting different space ratios for different portions of a single-layered auxiliary layer.

Preferably, a filling layer may be 5 to 10 cm thick, and an auxiliary layer may be 3 to 5 cm thick. With this thickness, treated water can permeate these layers smoothly without clogging them. This thickness is also effective for maintaining favorable treating effects.

In a multiple-layered auxiliary layer, preferably, the farther layer may comprise a fibrous structure made by knitting a number of fibers. A fibrous structure is superior in water passing ability due to a large space ratio thereof. Therefore, an auxiliary layer including a fibrous structure in its lower portion has better water passing ability in the lower portion thereof. This ensures smooth discharging of treated water.

Auxiliary layer may preferably comprise a number of layers as described above.

An auxiliary layer preferably has a larger space ratio than a filling layer. For a multiple-layered auxiliary layer, a farther layer preferably has a larger space ratio than a closer layer. For example, when both filling and auxiliary layers comprise a number of grain members, an auxiliary layer preferably comprises grains of larger average size (for example, an average grain diameter). In another example, for a multiple-layered auxiliary layer, grains for a farther layer from the filling layer are preferably larger in average size. Note that a grain member is not limited to a sphere here.

With the arrangement described in the above, a preferable liquid flow path and gas flow path are formed inside the auxiliary layer so that gas, such as air, flows along the gas flow path into the associated filling layer. For example, with a multiple-layered structure, liquid-flow and air-flow paths are formed between respective layers. In particular, if an auxiliary layer (for example, the components thereof) has water holding ability, more preferable liquid flow can be ensured.

When filling and auxiliary layers both comprise multiple layers, the components of the auxiliary layer preferably have a smaller average water holding ability than that of the filling layer.

Preferably, a treating tank to be used for the above treating has a vertical structure in which filling and auxiliary layers are arranged vertically.

Preferably, a secondary treating apparatus is also provided for treating the treated water discharged from the above auxiliary layer (primary treated water). The secondary treating apparatus preferably includes a filling layer filled with microorganism carriers for contacting treated water introduced into the apparatus so that a substantial amount of dissolved organic material can be removed from the treated water. As a result, the BOD of the final treated water is sufficiently lowered, and the final treated water is of preferable water quality.

Since a filling layer is formed in the above structure to treat primary treated water, dissolved organic materials remaining in the primary treated water can be effectively removed by the microorganisms stuck to the filling layer, while the liquid part permeates the filling layer. As a result, dissolved organic material can be effectively removed, so that the BOD can be sufficiently lowered.

Note that this secondary treating apparatus is usable as a waste water treating apparatus that treats types of organic waste water other than the primary treated water.

Preferably, the secondary treating apparatus further comprises an air supplying member for supplying and diffusing air or oxygen gas to the filling layer. A filling layer with air or oxygen supplied can remain in an aerobic condition even though it has a larger BOD burden imposed on it. This is effective to preserve sufficient aerobic microorganisms to perform adequate oxidation decomposition.

As described above, in the secondary treating apparatus, organic waste water is supplied to a filling layer, where it contacts a filling member. Since the filling member is maintained in an aerobic condition with air supply, and thus can hold aerobic microorganisms, organic material contained in the organic waste water is decomposed through oxidation by the aerobic microorganisms. In particular, since the filling layer through which the waste water passes is supplied with sufficient oxygen via supplied air in this apparatus, aerobic oxidation decomposition of organic material can be enhanced.

Further, since treated water is discharged via an auxiliary layer in this apparatus, it can be discharged smoothly to the outside. Specifically, although waste water is not easily discharged from a filling layer which is superior in water holding ability (i.e., relatively inferior in water passing ability), and may thus cause decay or clogging, it can smoothly come off an auxiliary layer which is superior in water passing ability to a filling layer and lies between the filling layer and the outside, creating an intermediate atmosphere. Treated water can more smoothly come off from the filling layer when such an auxiliary layer is provided adjacent to and at the bottom of the filling layer.

Also, the secondary treating apparatus further comprises the auxiliary layer for receiving treated water from the filling layer and discharging the received treated water. That is, when the auxiliary layer is provided to a secondary treating apparatus, similar to a treating apparatus for initially receiving organic waste water, treated water can be smoothly discharged from the filling layer. In particular, since this auxiliary layer is situated adjacent to and at the bottom of the filling layer, smooth downward shifting of treated water dropped from a filling layer can be further enhanced. This is effective in preventing decay and clogging in the filling layer.

Preferably, the secondary treating apparatus has a multiple-layered structure in which a number of filling and auxiliary layers are alternately laminated. This structure is effective in preventing treated water from being short-circuited, and promotes smooth downward shifting of the treated water.

Air or oxygen gas is preferably introduced into and diffused in the number of auxiliary layers in the secondary treating apparatus. With this arrangement, all of the filling layers in the secondary treating apparatus can be effectively kept in an aerobic condition. Moreover, since the auxiliary layers can serve as an air diffuser, air can be diffused throughout the filling layers.

Filling layers of the secondary treating apparatus may be preferably filled with wood chips, which are superior in holding microorganisms. Also, similar to the primary treating apparatus, an auxiliary layer may preferably comprise such material that is superior in water passing ability to that which is used as microorganism carriers of the filling layer. Specifically, grain foam glass may be preferably used. An auxiliary layer comprising such material will be sufficiently capable of conducting adequate aerobic treatment, and smoothly discharging treated water. As a result, clogging and decay can be suppressed in the filling layer.

As described above, preferably, the secondary treating apparatus has a multiple-layered structure in which a number of filling and auxiliary layers are laminated.

More preferably, a clogging prevention layer may be provided, comprising wood chips with a larger grain diameter, on the uppermost filling layer to prevent clogging on the surface, while a coarse-stitched fibrous-structured layer may be provided beneath the lowermost auxiliary layer to promote smoother discharging of treated water.

Also, preferably, a reserve tank is provided for storing primary treated water so that the stored primary treated water is supplied to the secondary treating apparatus. With this arrangement, the primary treated water can be temporarily stored. This enables adjustment of the processing load imposed on the secondary treating apparatus. Further, the primary and secondary treating apparatus can be installed side-by-side since primary treated water can be easily supplied by a pump, or the like, which makes it possible to avoid apparatuses installed being too tall in height.

Preferably, air may be provided inside the reserve tank so that aeration is carried out inside. This can prevent decay of the stored primary treated water, and also assist aeration in the secondary treating apparatus.

Further, preferably, a filter is provided for filtering treated water so that filtered treated water is supplied to the secondary treating apparatus. This is effective in reducing the amount of SS to be introduced in the secondary treating apparatus along with the treated water, and clogging of the secondary treating apparatus due to introduced SS can be effectively prevented. The filter may be made using cloth, plastic, or a stainless steel mesh member, and may be washed with water.

Alternatively, SS to be introduced into the secondary treating apparatus can be reduced by having the SS in the primary treated water settled in the reserve tank without performing aeration inside the reserve tank, and selectively supplying the treated water to the secondary treating apparatus. The settled SS in the bottom of the reserve tank may be returned to the primary treated apparatus for re-treating.

Further preferably, the filling layer in the primary and secondary treating apparatus may be kept at 30° C. or above. Under this condition, aerobic microorganisms can be preserved in a sufficiently active state in the filling layer so that effective treating can be achieved. A heater may be switched on when the temperature drops so as to maintain an appropriate temperature.

The secondary treating apparatus may preferably have a vertical structure in which filling and auxiliary layers are situated vertically.

Preferably, microorganism carriers of the filling layer each have a grain diameter of 2 mm to 5 mm. Treated water may be more smoothly discharged from a filling layer when microorganism carriers, such as wood chips, having a larger grain diameter are used. However, a grain diameter of 2 to 5 mm may be preferable as wood chips having too large a diameter may impair treating effects. Using such wood chips will ensure a long continuous treating time while maintaining a preferable quality with treated water.

Preferably, an auxiliary layer comprises one or more layers, in which a layer closer to where treated water is discharged has a larger space ratio than that with a layer on the opposite side. In particular, the auxiliary layer at the lowermost stage may have a fibrous-structure layer on its side closer to where the water is discharged. In this case, it is preferable to form a closer layer using grain members, and a farther layer on the side where water is drained, using a fibrous-like structure. Foam glass is a preferable grain member. Auxiliary layers except for the one at the lowermost stage, may have a structure in which the middle part thereof contains a larger space than both end parts thereof (upper and lower layers).

It should be noted that the term "a grain diameter" used throughout this specification, is defined by the size of the openings of a sieve. For example, a grain diameter 2 mm to 5 mm corresponds to a grain which cannot pass through a sieve with a 2 mm opening but can pass through a sieve with a 5 mm opening. Thus, grains are not limited to spheres

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENT

In the following, a preferred embodiment of the present invention will be described with reference to the accompanying drawings.

Figure 1:
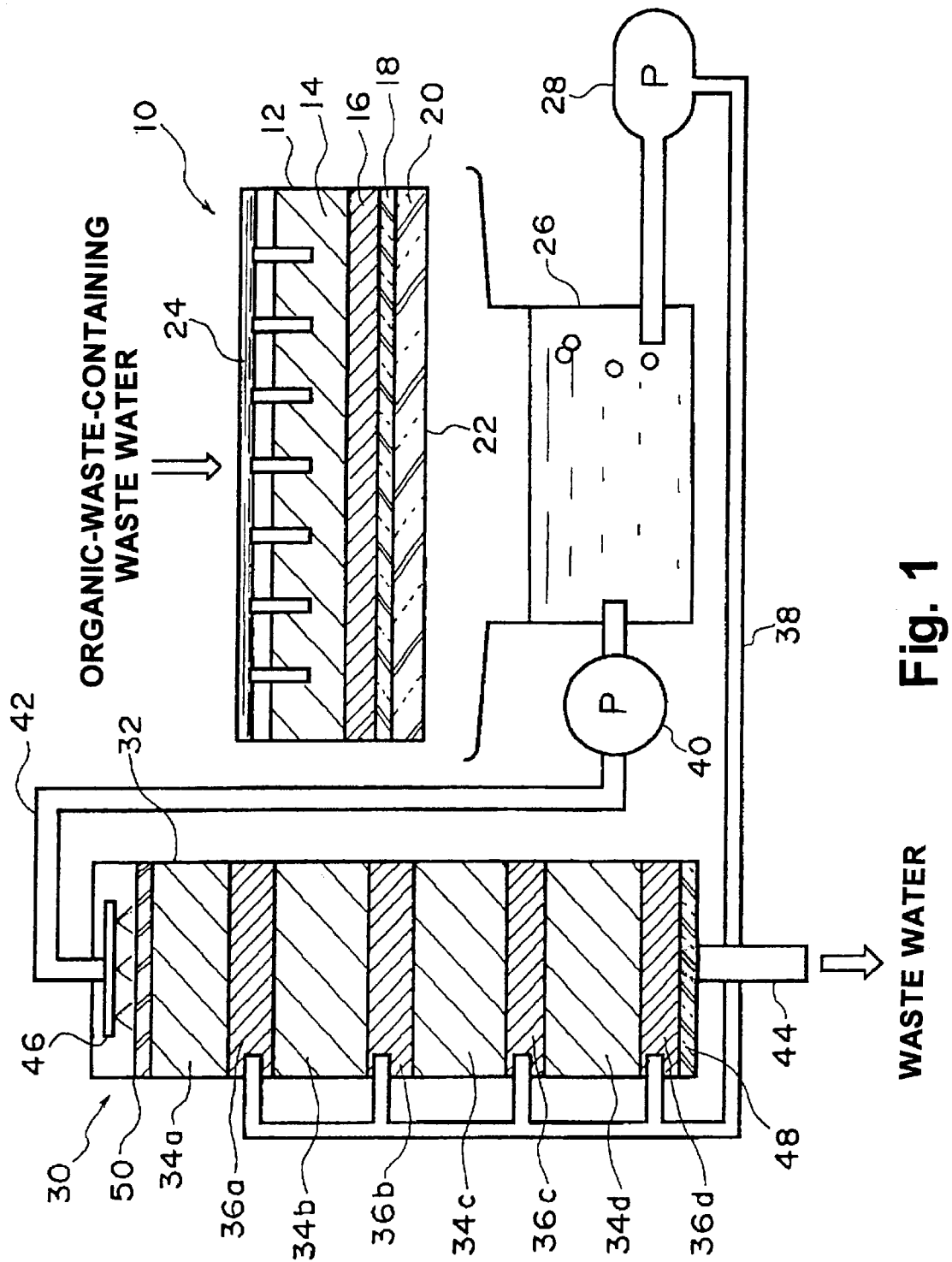
FIG. 1 is a front view showing a schematic structure of an organic waste water treating apparatus of a preferred embodiment of the present invention.

Referring to FIG. 1, the organic waste water treating apparatus treats waste water containing solid organic materials. In this embodiment, the apparatus treats waste water containing organic material, such as food waste.

A disposal unit is mounted under the plug hole of a kitchen sink to crush organic waste. While using the disposal unit, the tap water is kept running so that crushed waste is blended into the running water and drained through a drain pipe. It should be noted that an apparatus of the present invention installed below a kitchen sink will eliminate the need for a drain pipe. Waste water containing crushed organic waste flows into a first treating tank 10 which serves as a primary treating apparatus. Note that the apparatus of this embodiment may be usable in treating waste water of a different type which is, however, similar in content.

Figure 2:
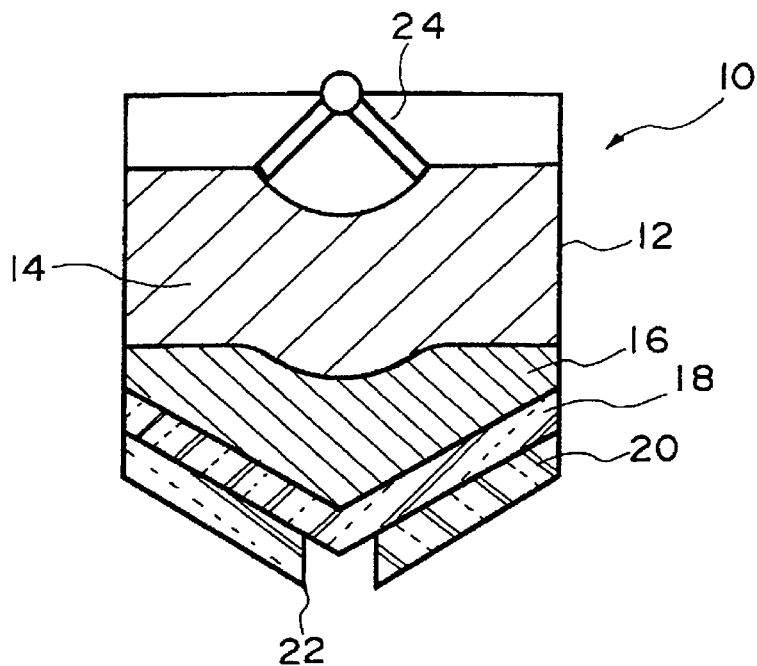
FIG. 2 is a side view showing a schematic structure of a first treating tank.

Referring to FIGS. 1 and 2, the first treating tank 10 has a vessel 12 comprising a rectangular upper part with a released upper end and a hopper-shaped lower part. A filling layer 14 containing filling material is formed inside the vessel 12. The filling material may be wood chips, e.g., sawdust of Japanese cryptomeria, each having a grain diameter of a few mm (approximately 1.5 mm in this embodiment). Note that any materials other than Japanese cryptomeria, such as porous plastic, glass, and mesh member, may also be usable as filling material, if they can filter solid organic materials, retain water, and foster microorganisms for decomposing organic materials. A filling layer (treating layer) 14 comprising wood chips or biodegradable plastic is advantageous in that it can be used as compost after use in this apparatus. The filling layer 14 may have a thickness of, for example, 15 cm.

Beneath the filling layer 14 lies a foam glass layer 16 which serves as an auxiliary layer (a carrier layer for carrying the filling layer 14). The foam glass layer 16 is filled with foam glass grains, each having a larger grain diameter than a wood chip of the filling layer 14, i.e., approximately 5 mm in this case. Due to the difference in grain diameter, the foam glass layer 16 has a larger space ratio than the filling layer 14. Note that these foam glass grains are made by crushing natural glass-like rock and burning the crushed rock to cause foaming at a high temperature. Those which are generally used for preventing root rot and soil amendments may be preferably used. The foam glass layer 16 may have a thickness of, for instance, 10 cm.

Further, beneath the foam glass layer 16 lies a fibrous-structured layer 18 which also serves as an auxiliary layer. The fibrous-structured layer 18 contains coarser grains than the foam glass layer 16, thus having a larger space ratio. The fibrous-structured layer 18 is made, for instance, by knitting hard plastic fibers, each having a diameter of approximately 0.5 mm, into a mat-like member. A coarse-stitched mat-like member which is generally used for filtering in an aquarium tank, may be preferably used.

Further, below the fibrous-structured layer 18, a corrugated sheet 20 is provided for collecting and discharging primary treated water. The corrugated sheet 20 is arranged such that valleys direct the drain opening 22 so that waste water can easily run downward. The fibrous-structured layer 18 and the corrugated sheet 20 have a thickness of, for example, 2 to 3 cm, respectively. The corrugated sheet 20 may also be considered as a part of an auxiliary layer.

The vessel 12 has a constant depth in its longitudinal direction, having a drain opening 22 on its base surface. Alternatively, the vessel 12 may slightly incline in the longitudinal direction, having a drain opening 22 at the lowest part thereof.

A plowing device 24 is provided on the surface of the filling layer 14 for plowing the surface. The plowing device 24, which is rotatable or reciprocable, is a paddle-like device in this case. However, any other devices which plow the filling layer 14 for preventing the layer 14 from becoming lumpy can be used as the plowing device 24. For example, any device which can move with its comb-like or rake-like part pressed onto the surface of the layer 14, may be used.

In operation, organic-waste-containing waste water is poured into a first treating tank 10 of the above structure. The water is filtered by the filling layer 14 so that the solid contained in the water, i.e., crushed organic waste, is separated from the liquid part and remains in the layer 14, while the liquid part permeates into the layers 14, 16, 18. When the liquid part finally reaches the corrugated sheet 20, it flows along the valleys, and drops through the drain opening 22 into the reserve tank 26 below to be stored therein.

The reserve tank 26 is supplied with compressed air from an air pump 28 so that the water stored in the tank 26 (primary treated water) is subjected to aeration treatment to thereby prevent decay of the stored water in the tank 26.

In the above arrangement, as described above, the filling layer 14 contains wood chips or a porous member having a large surface and capable of absorbing water. In addition, the inside of the filling layer 14 is kept in an aerobic condition due to the air hovering in the space among grains. Under this condition, the filling member of the filling layer 14 contains abundant organic materials having been separated through filtering from the permeating waste water, and serves as a carrier of microorganisms, so that aerobic microorganisms are fostered inside the filling layer 14. The aerobic microorganisms decompose solid (crushed organic waste) or BOD components in contact with the filling member. Wood chips, in particular, are preferable to be used as a microorganism carrier, and can effectively keep a sufficient amount of microorganisms inside the filling layer 14 to carry out adequate treating.

Moreover, as described above, a foam glass layer 16 is provided lying beneath the first filling layer 14 in the first treating tank 10 in this embodiment. The foam glass layer 16 contains foam glass grains which are a porous member, similar to the wood chips of the filling layer 14 but each larger in size. When layers 14 and 16 are used, since a similar atmosphere can be created between the piled-up layers, the liquid part dropping through the filling layer 14 by means of a gravitation can be smoothly absorbed by the foam glass layer 16 beneath. As a result, the bottom of the filling layer 14 can be effectively prevented from being clogged. The shape of the filling layer of this embodiment, i.e., a large plane area and a shallow depth, is also effective in enhancing the smoothness with which the liquid is discharged downward.

Since the foam glass layer 16 also retains some microorganisms, the layer 16 also can remove dissolved BOD components, while maintaining sufficient water passing ability.

Here, a different case from the above is taken as an example, in which the filling layer 14 is directly supported by the vessel 12 without auxiliary layers. In this structure, the waste water dropping through the filling layer 14 is next exposed to the air. In this case, the waste water may not smoothly come off the filling layer 14 due to, for example, surface tension of water along the boundary between the filling layer 14 and air. This may cause a moist part around the bottom of the filling layer 14. The moist part tends to be changed into an anaerobic condition, which may cause decay and clogging of the filling layer 14. The apparatus of this embodiment can solve this problem.

Further, the waste water dropping through the foam glass layer 16 can also be smoothly absorbed by the fibrous-structured layer 18, which lies beneath the foam glass layer 16 with a majority area contacting the foam glass layer 16. The fibrous-structured layer 18 comprises a fibrous mat-like member.

Subsequently, the waste water coming off the fibrous-structured layer 18 flows on the corrugated sheet 20, and is smoothly discharged to the outside.

As described above, according to the first treating tank of this embodiment, waste water can flow downward relatively smoothly throughout the entire treating tank. Therefore, a moist part is unlikely to be caused around the bottom of the filling layer 14, as a result of which decay and clogging can be effectively prevented in the layer 14. Moreover, due to aerobic microorganisms fostered in the layers 14, 16, BOD components can be effectively removed. With these advantages, the first treating tank of this embodiment remains capable of use for a long time for effective treating of solid-organic waste water.

It should be noted that the plowing device 24 plows only the surface of the filling layer 14 for preventing clogging on the layer 14 surface, and is not intended to stir the entire filling layer 14. Since the surface of the filling layer 14 is less clogged because of the plowing device 24, waste water can be soaked up comparatively smoothly, and more air can be supplied via the surface of the layer 14.

In addition to the above, an air supplier provided to the first treating tank 10 will promote aerobic decomposition with respect to organic solid, and enables the maintaining of a preferable water content (40 to 80%) of solid decomposition. This can resultantly prevent clogging in the filling layer 14.

After passing through the above layers in the first treating tank 10, the liquid part is drained from the tank 10 (primary treated water) and stored in the reserve tank 26. The stored primary treated water is supplied to a secondary treating device, or a second treating tank 30, for further treating in this embodiment.

Figure 3:
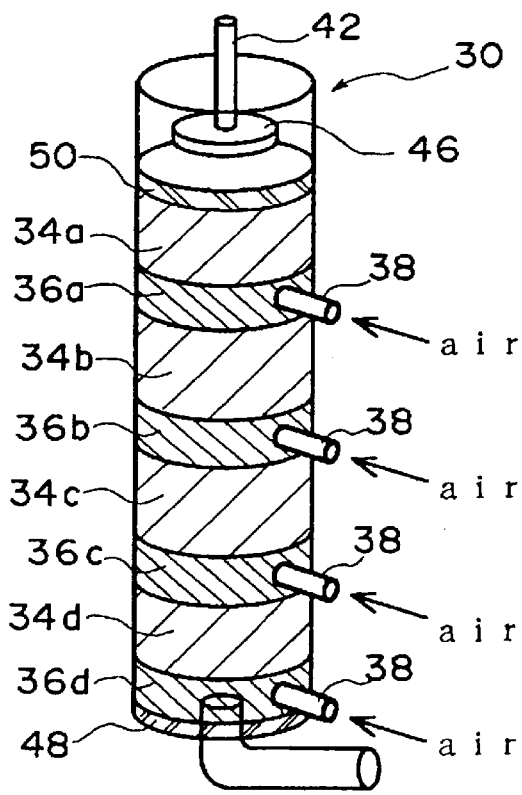
FIG. 3 is a perspective view showing a schematic structure of a second treating tank.

Referring to FIGS. 1 and 3, the second treating tank 30 of this embodiment comprises a cylindrical vessel 32 of a four-stage structure. In the second treating tank 30, a number of filling layers (treating layers) 34 are laminated, each accompanying a foam glass layer 36 at the bottom thereof for serving as an auxiliary layer. In other words, the second treating tank 30 comprises a first layer including a first filling layer (treating layer) 34a and a first foam glass layer 36a, a second layer including a second filling layer (treating layer) 34b and a second foam glass layer 36b, a third layer including a third filling layer (treating layer) 34c and a third foam glass layer 36c, and a fourth layer including a fourth filling layer (treating layer) 34d and a fourth foam glass layer 36d. Respective filling layers 34 contain wood chips, similar to the filling layer 14 of the first treating tank 10, and respective foam glass layers 36 contain foam glass grains, similar to the foam glass layer 16.

An air pipe 38 is inserted into the first, second, third, and fourth foam glass layers 36a, 36b, 36c, 36d. The other end of the air pipe 38 is connected to an air pump 28 so that compressed air is supplied via the connected foam glass layers 36 to associated filling layers 34.

The upper part of the vessel 32 is connected to a primary treated water supplying pipe 42, the other end of which is connected via a water pump 40 to the reserve tank 26, so that the primary treated water stored in the reserve tank 26 is supplied to the first filling layer 34a from the upper part of the vessel 32. The base part of the vessel 32 is connected to a drain pipe 44 for draining treated water.

The tip end of the primary treated water supplying pipe 42 inside the second treating tank 30 is attached by a sprinkler 46 for spraying the supplied primary treated water toward the filling layer 34a inside the tank 30. The sprinkler 46 may be a circular or annular type having holes on the base surface thereof, or a type in which water overflows the upper rim thereof.

In addition, a fibrous-structured layer 48 having an identical structure to that of the fibrous-structured layer 18 of the first treating tank 10, is provided beneath the foam glass layer 36d on the inside base surface of the vessel 32. Provision of this layer 48 enables smooth discharging of treated water from the second treating tank 30.

Further, a clogging prevention layer 50 is provided above the first filling layer 34a, which has a 3 cm thickness and consists of multiple wood chip layers. The lowest layer of the multiple wood chip layers (clogging prevention layer 50) contains wood chip grains each of 2 mm in grain diameter; the second lowest layer contains 3 mm wood chips; and the top layer contains 5 mm wood chips.

In operation, the primary treated water is supplied from the reserve tank 26 to the second treating tank 30 by driving the water pump 40. The supplied treated water is sprayed over the entire surface of the first filling layer 34a via the sprinkler 46. The treated water gradually permeates downward through the four stages of the filling layer 34 and the foam glass layers 36 while contacting wood chips of the respective filling layers 34.

Incidentally, the inside of the second treating tank 30 is kept in an aerobic condition with air supplied by the air pump 28. Therefore, aerobic microorganisms stick to the wood chips of the respective filling layers 34. The aerobic microorganisms oxidize BOD components remaining in the permeating primary treated water to thereby effectively decompose the BOD components. Since porous wood chips are particularly preferable to be used as an aerobic microorganism carrier, effective aerobic microorganism treatment can be performed in the second treating tank 30. Wood chips are also advantageous in that they are inexpensive.

The respective filling layers 34 are carried by associated foam glass layers 36, which comprise foam glass. Similar to the first treating tank 10, these foam glass grains effectively function to send the treated water from the upper wood chips to the lower wood chips, preventing clogging in the respective filling layers 34.

The second treating tank 30 of this embodiment is vertically longer than the first treating tank 10 and has a multiple-stage structure. Due to this structure, the treated water having dropped from an upper filling layer 34 is dispersed in the subsequent foam glass layer 36 with air supplied before further permeating into the filling layer 34 below. This prevents the treated water from being short-circuited so that the treated water will be surely treated in the tank 30.

Also, since air is supplied to the respective foam glass layers 36, each having a relatively large space ratio, the air is diffused by the foam glass layer 36 which act as an air diffuser, so that aeration can be effectively carried out inside the second treating tank 30. Moreover, since the air supplied to the respective foam glass layers 36 goes upward in the tank 30, a relatively larger amount of air is provided at upper stages of the tank 30. This is effective in carrying out sufficient aeration in the secondary treating tank 30 because the upper layers, which tend to receive water of higher BOD concentration, contain more air.

It should be noted that treating efficiency is improved when filling layer 34 and foam glass layers 36 are piled up at a larger number of stages inside the second treating tank 30. However, in actuality, three or four stages may be feasible.

Although air is supplied to respective foam glass layers 36 in the above, an air diffusing pipe may be inserted into the filling layers 34 for air diffusion. In this case, an air diffusing pipe may be provided either vertically or horizontally, but preferably vertically so as to pierce the center of the second treating tank 30.

As described above, the above secondary treating tank 30 has a structure including only filling layers 34 and foam glass layers 36, and no other partition wall, or the like. In addition, the air pipe is inserted into the vessel 32 from the lateral side and extends inside by only a short extent. With this structure, wood chips and foam glass grains can be easily extracted from the vessel 32 for periodic exchanging. Wood chips and foam glass grains may be extracted either through the upper surface of the vessel 32 or an exchange window provided on a lower part of the vessel 32.

In operation, primary treated water from the first treating tank 10 is initially supplied to the first filling layer 34a, which thus naturally receives treated water containing a substantial amount of SS and likely to be clogged. In this embodiment, a clogging prevention layer 50 is additionally provided to the upper part of the first filling layer 34a. With this layer 50, clogging on the surface of the first filling layer 34a can be prevented. As a result, the filling layer 34a can endure prolonged use for preferable treating.

A heater (not shown) is also provided around the vessels 12, 32 in this embodiment so that the inside temperature of the first and second treating tanks 10, 30 is kept above 30° C. by switching on/off the heater while referring to the inside temperature measured by thermometers provided inside thereof. With temperature adjustment, microorganisms inside the tanks 10, 30 can be kept adequately active. However, heating may often be unnecessary because inside temperature is generally higher than the outside temperature because of the heat generation caused by organic material oxidation decomposition by aerobic microorganisms. Moreover, a heater capable of maintaining 30° C. or higher temperature may not always be necessary as a temporary drop in temperature will not cause any substantial damage, and a temperature of 30° C. or higher may not be critical.

The tank 30 may preferably be supplied with gaseous oxygen or air with a high oxygen content (oxygen rich air), instead of simple air.

The tank 30 may contain at least one pair of a filling layer 34 and a foam glass layer (auxiliary layers) 36. The lowest layer may not always be a form glass layer 36. That is, a filling layer 34 may be provided below the foam glass layer 36 so that treated water is discharged from the lowest filling layer 34.

Installation Place

The apparatus of this preferred embodiment basically comprises treating tanks 10, 30, as described above, and treated organic waste water discharged from a disposal unit attached at a scupper of a home-use sink. Therefore, the apparatus of this embodiment can be accommodated in a space below a kitchen sink. Alternatively, the apparatus may be provided outside. In this case, a disposal unit may be connected to the apparatus via a pipe which can transport waste water and crushed organic waste, preferably utilizing gravitation.

Modification

Although the apparatus of this embodiment treats crushed-organic-waste-containing waste water discharged from a disposal unit, the apparatus does not have to be a separate device from a disposal unit, and may be integrally formed with the disposal unit. In this case, a disposal unit is integrally formed on the upper part of the first treating tank 10 so that the disposal unit receives and crushes organic waste discharged from the sink and supplies crushed organic waste to the continuous first treating apparatus 10. A disposal unit-combined apparatus of this embodiment may be preferably provided directly below a sink, or alternatively, outside.

Wood Chip Size

In the above embodiment, wood chips in the filling. Layers 14, 34 of the first and second treating tanks 10, 30 are each as large as approximately 1.5 mm in a grain diameter (most less than 2 mm). An experiment using various wood chips of different diameters proved that larger wood chips resulted in better permeability of waste water. It also proved that the first and second treating tanks 10, 30 preserved sufficient treating capability to achieve predetermined water quality with treated water for a long time when wood chips each having a grain diameter of 2 to 5 mm were filled in the filling layers 14, 34.

Foam Glass Layer (Auxiliary layer) Structure

Foam glass grains for the foam glass layers 16, 36 may be substituted by wood chips. In other words, an auxiliary layer for carrying the filling layers 14, 34, namely, foam glass layers 16, 36, may be made of the same material as that of the filling layers 14, 34 (though an auxiliary layer contains larger grains). Wood chips, superior in water holding ability, can achieve a similar result as that with foam glass grains. Wood chips are also advantageous in that they can be used as compost when disposed of. Alternatively, a biodegradable plastic member may be used.

An auxiliary layer of the first treating tank 10 and the lowest auxiliary layer of the second treating tank 30 may consist of multiple layers including a foam glass layer and a fibrous-structure nature, in which a lower layer has a larger a space ratio. This arrangement encourages smooth discharging of permeated treated water from the auxiliary layer to outside. Alternatively, the same result may be achieved by using a single layer in which lower portions thereof have a larger space ratio.

First Treating Tank 10 Stricture

The first treating tank 10 comprises a fibrous-structured layer 18, a foam glass layer 16, and a filling layer 14 piled up in this order from bottom to top, as described above. In an experiment using various layers of different thickness, the best result was obtained when wood chips each being 1.7 mm to 5 mm (mainly 2 mm or larger) in grain diameter were used, occupying 70% or more of the total wood chips filled in a wood chip layer having a 5 cm to 10 cm thickness. A foam glass layer 16 accompanying the above filling layer 14 preferably has a thickness of 3 cm to 5 cm.

Sludge Removal from Primary treated water

In the above embodiment, the primary treated water is exposed to aeration in the reserve tank 26 for preventing decay of the stored water. With this arrangement, however, the primary treated water is introduced basically intact into the second treating tank 30. Since the primary treated water generally contains a substantial amount of SS (suspension solid matter), the second treating tank 30 may easily become clogged.

In light of the above, it is preferable that aeration is not carried out or is carried out only slightly with respect to the primary treated water in the reserve tank 30 so that sludge in the primary treated water is settled in the reserve tank 30. The settled sludge may be sent back to the first treating tank 10. This arrangement may effectively reduce the amount of SS to be introduced into the secondary treating tank 30, and prevent clogging in the tank 30. As a result, the secondary treating tank 30 can remain durable for stable treating for a long time.

Another advantage of this arrangement is that a specific sludge treating device is unnecessary as the settled sludge is circulated back to the first treating tank 10 for re-treating. Note that settled sludge may not always be returned to the first treating tank 10. Instead, it may be discharged to the outside if an external sludge treating facility is available.

Alternatively, a filter may be provided in order to filter the primary treated water supplied from the first treating tank 10 to thereby remove the contained SS before the water is transmitted to the second treating tank 30. This arrangement can also effectively prevent clogging in the second treating tank 30. The filter may be provided either upstream of, inside, or downstream of the reserve tank 26, or even inside the pipe or at the inlet for the primary treated water of the second treating tank. A preferable filter may be made of cloth, such as a sheet of gauze (e.g., BENCOT by Asahi Chemicals), or a stainless steel sieve. In the latter case, a stainless steel sieve of 83 mesh (made by knitting lines having a diameter of approximately 0.12 mm to have stitches each of approximately 0.18 mm diameter) is preferable. The filter may be preferably washed or exchanged periodically. Washing water may be supplied back to the first treating tank 10.

Second Treating Tank 30 Structure

Treated water having permeated at a high speed inside the second treating tank 30 has a large BOD, while that permeated at a low speed has a low BOD. Also, treated water having permeated a tall second treating tank 30 contains a small amount of SS, while that permeating a short second treating tank 30 contains a large amount of SS. In light of this, BOD and SS of treated water can be adjusted by adjusting liquid velocity and the height of the second treating tank 30. Although the required water quality in terms of BOD and SS may vary depending on local public bodies, the apparatus of this embodiment can cope with different requirements by adjusting the liquid velocity and height of the second treating tank 30. Note that the height of the tank 30 may be adjusted by changing the position of an inlet for primary treated water, the number of stages, the position of an outlet for the treated water, or any other ways.

It should be noted that application of the secondary treating tank 30 is not limited to treating of waste water containing organic material crushed by a disposal unit, but also to treating of other types of kitchen drain water. Specifically, kitchen drain water is supplied directly or via a reserve tank 26 to the second treating tank 30 for treating. This can reduce a total amount of organic components in kitchen waste water, so that a total amount of organic components in waste water discharged from a home, or the like, can be reduced.

Cartridge-type Second Treating Tank

Figure 4:
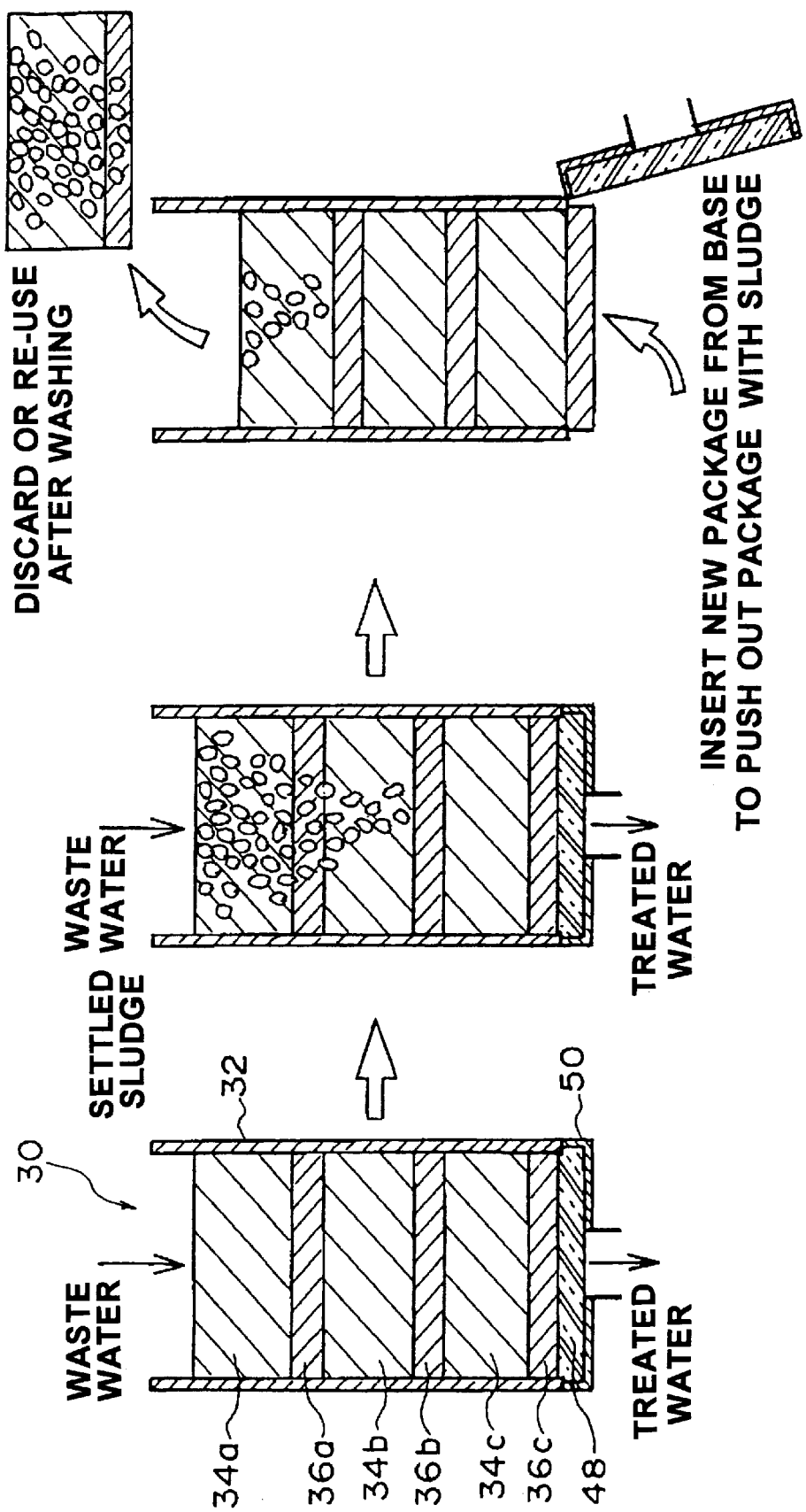
FIG. 4 is a diagram showing a structure of a second treating tank of a cartridge type.
Figure 5:
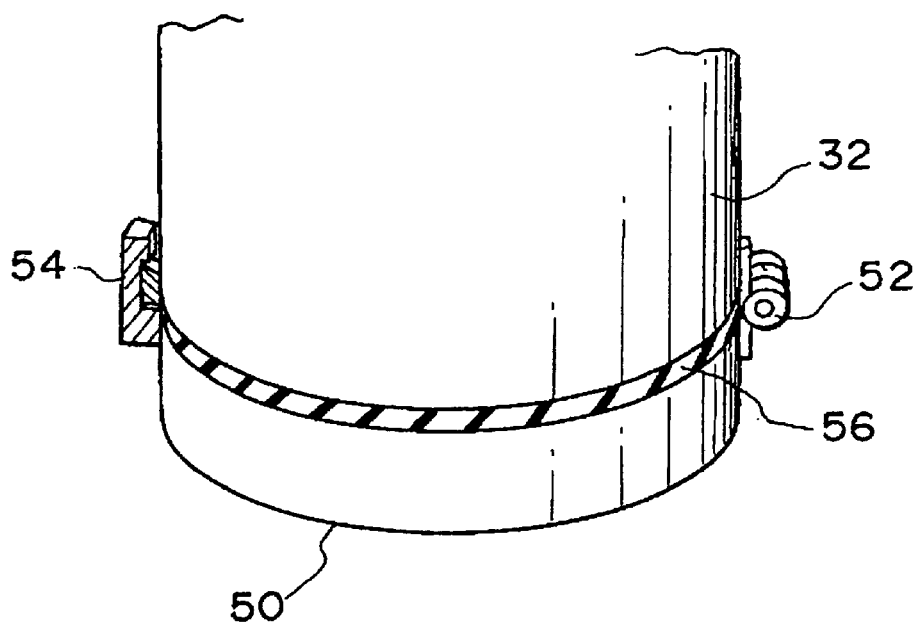
FIG. 5 is a diagram showing a structure of a base of a second treating tank of a cartridge type.

In a modified second treating tank 30 shown in FIGS. 4 and 5, a filling layer 34 and a foam glass layer 36 are detachable as a pair or separately. Specifically, a base cap 50 is attached by means of a hinge 52 to the base surface of the vessel 32, and the base cap 50, accommodating a fibrous-structured layer 48, is fixed to the vessel 32 by means of a fitting metal 54. A rubber packing 56 is provided between the base cap 50 and the vessel 32 for preventing water leakage with the base cap 50 closed. With this arrangement, the base surface of the vessel 32 is closed by latching the fitting metal 54, and opened by unlatching the fitting metal 54.

With the base opened, a new filling layer 34 and a new foam glass layer 36 are inserted into the vessel 32 through the base surface, while the uppermost filling layer 34 and foam glass layer 36 are taken off the vessel 32. As they are close to the inlet for the treated water, the uppermost filling layer 34 and foam glass layer 36 are imposed with a heavy treating load, and tend to be stuck by sludge as treating is carried on. Therefore, in this arrangement, all layers in the tank 30 are used eventually with the same treating burden by inserting new filling layer 34 and foam glass layer 36 from the base surface and extracting uppermost filling layer 34 and foam glass layer 36 from the upper surface so that effective treating can be maintained.

By In order to facilitate this inserting and extracting treatment, one filling layer 34 and one foam glass layer 36 are packed together as a pair in a vinyl net pack or an elastic tube so that a packed filling layer 34 and foam glass layer 36 can be easily inserted or extracted with respect to the vessel 32.

The extracted filling layer 34 and foam glass layer 36 may be washed for re-use. Preferably, a filling layer 34 may be used as compost after prolonged use.

Alternatively, a filling layer 34 and a foam glass layer 36 are separately packed for separate exchanging. Alternatively, the uppermost package or layers with settled sludge may be extracted and exchanged for a new package or layers, instead of inserting a new one from the base surface.

Figure 6:
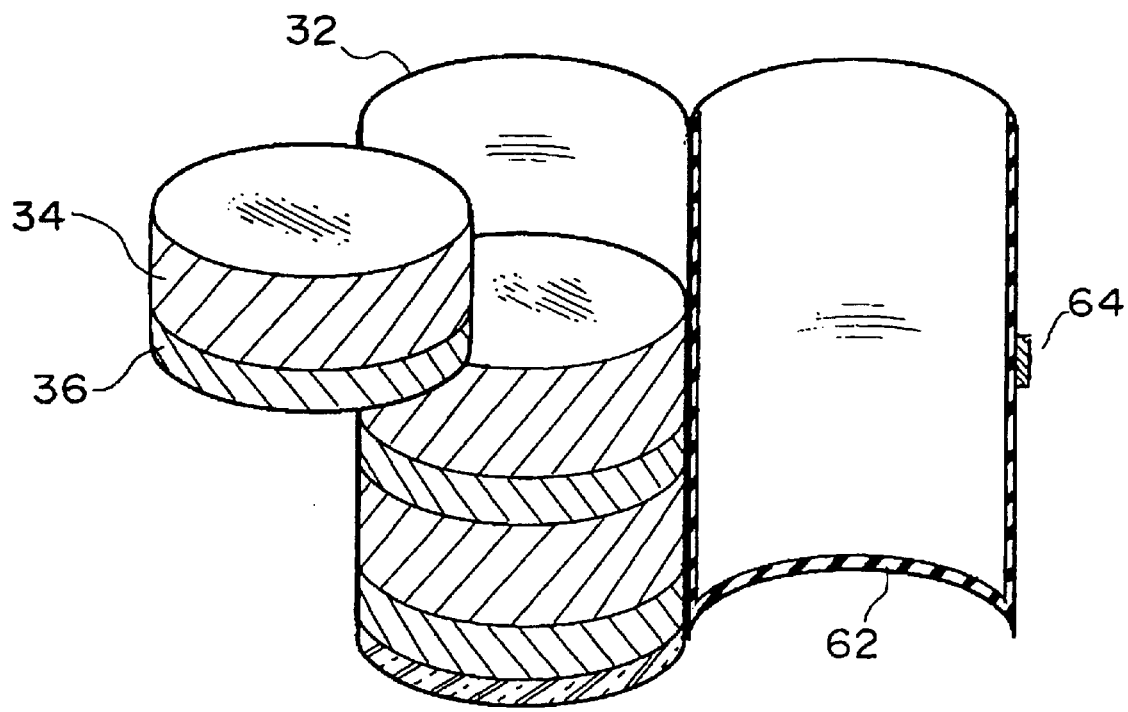
FIG. 6 is a diagram showing another structure of a second treating tank of a cartridge type.
Figure 7:
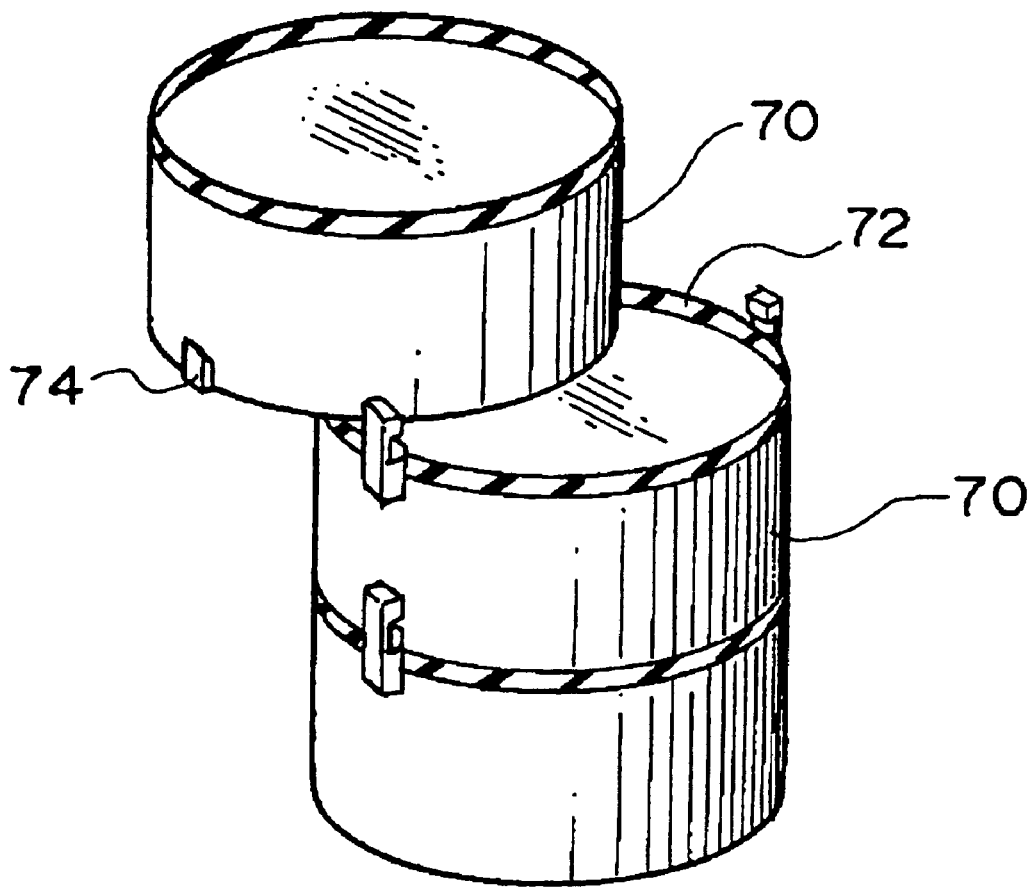
FIG. 7 is a diagram showing yet another structure of a second treating tank of a cartridge type.

FIGS. 6 and 7 show another modification of the second treating tank 30 which includes another type of cartridge filling layer and foam glass layer having a different structure from the above.

Referring to FIG. 6, the vessel 32 is vertically halved. Both halves are connected by means of a hinge (not shown) such that the side wall of one of the halves of the vessels 32 can be opened/closed like a door. The base surface of the vessel 32 is fixed to one of the halves. A rubber packing 62 is provided at a part where the side walls of the both halves abut on each other, for preventing water leakage when the side walls are closed. A fitting metal 64 is provided to the vessel 32 to fix the vessel 32 in a closed state.

With sludge kept in the filling layer 34 due to prolonged use, the vessel 32 is opened by unlatching the fitting metal 64 so that the filling layer 34 and the foam glass layer 36 are extracted to be exchanged for a new package. This arrangement facilitates exchanging a filling layer 34 and a foam glass layer 36 for new ones at any time.

Referring to FIG. 7, the vessel 32 comprises a number of columns 70, each containing a filling layer 34 and a foam glass layer 36. Respective columns 70 are connectable in an up-and-down direction with other columns, and a rubber packing 72 is provided at respective connections for preventing water leakage. A fitting metal 74 is provided to connect respective columns 70. The upper and base surfaces of respective columns are made using a mesh-like member With sludge kept in the vessel 32, the filling layer 34 and the foam glass layer 36 are removed together with the associated column 70, and exchanged for a new column containing a new filling layer 34 and a foam glass layer 36. Alternatively, after a column is extracted, only the inside filling layer 34 and foam glass layer 36 may be exchanged for new ones. This arrangement enables exchanging of desired filling layer 34 and foam glass layer 36 for new ones.

Instead of exchanging respective layers as described above, settled sludge inside the vessel 32 may be washed away by pouring water into the vessel 32 from the inlet for the treated water, or an inlet or outlet for air.

It should be noted that FIGS. 4 to 6 schematically show the major elements only, and an air pipe 38 and other members are omitted.

EXAMPLES

Experiment 1

Laboratory Conditions

A number of plastic tanks (20×30×20 cm) were prepared, and used as a first treating tank 10. A drain hole of 5 cm in diameter was formed on the respective base surfaces of the tanks 10. Various carrier layers (an auxiliary layer) were formed by differently combining foam glass grains (approximately 5 mm in diameter), a ceramic filtering member (a hollow hexangular cylinder of approximately 1 cm round), gravel (approximately 1 cm in a grain diameter), and a fibrous structure (a mat-like member made by knitting hard plastic lines of approximately 0.5 mm in diameter), and respectively filled in different tanks 10. Woods chips having a water content of approximately 70% were further filled above the carrier layers in the respective tanks 10.

Referring to Table 1, Tank A contained a ceramic filtering member (3 kg) and wood chips piled up in this order. Similarly, Tank B contained a ceramic filtering member (1.5 kg) and wood chips; Tank C contained a ceramic filtering member (1.5 kg), foam glass grains (3 cm thick), and wood chips; Tank D contained a ceramic filtering member (1.5 kg), gravel (2 kg), and wood chips; Tank E contained a fibrous-structure member (2 cm thickness), foam glass grains (1 cm thick), and wood chips. Tank F contained wood chips only.

TABLE 1

Structures of Experimental Treating Tanks

| | Ceramic filtering member | Gravel | Foam glass | Fibrous structure | Wood chips |
|---|---|---|---|---|---|
| Tank A | 3 (kg) | — | — | — | 1.4 (kg) |
| Tank B | 1.5 | — | — | — | 1.4 |
| Tank C | 1.5 | — | 3(cm thick) | — | 1.4 |
| Tank D | 1.5 | 2 | — | — | 1.4 |
| Tank E | — | — | 1 | 2(cm thick) | 1.4 |
| Tank F | — | — | — | — | 1.4 |

1 kg of organic waste was crushed by a disposal unit together with 12 liters (L) of water to thereby generate crushed-organic-waste-containing waste water. 2 L of such water was poured into the respective tanks A to F every day to see the changes in SS (suspension solid matters) of the water discharged from the respective tanks, and changes in color of the wood chips.

Experimental Results

Figure 8:
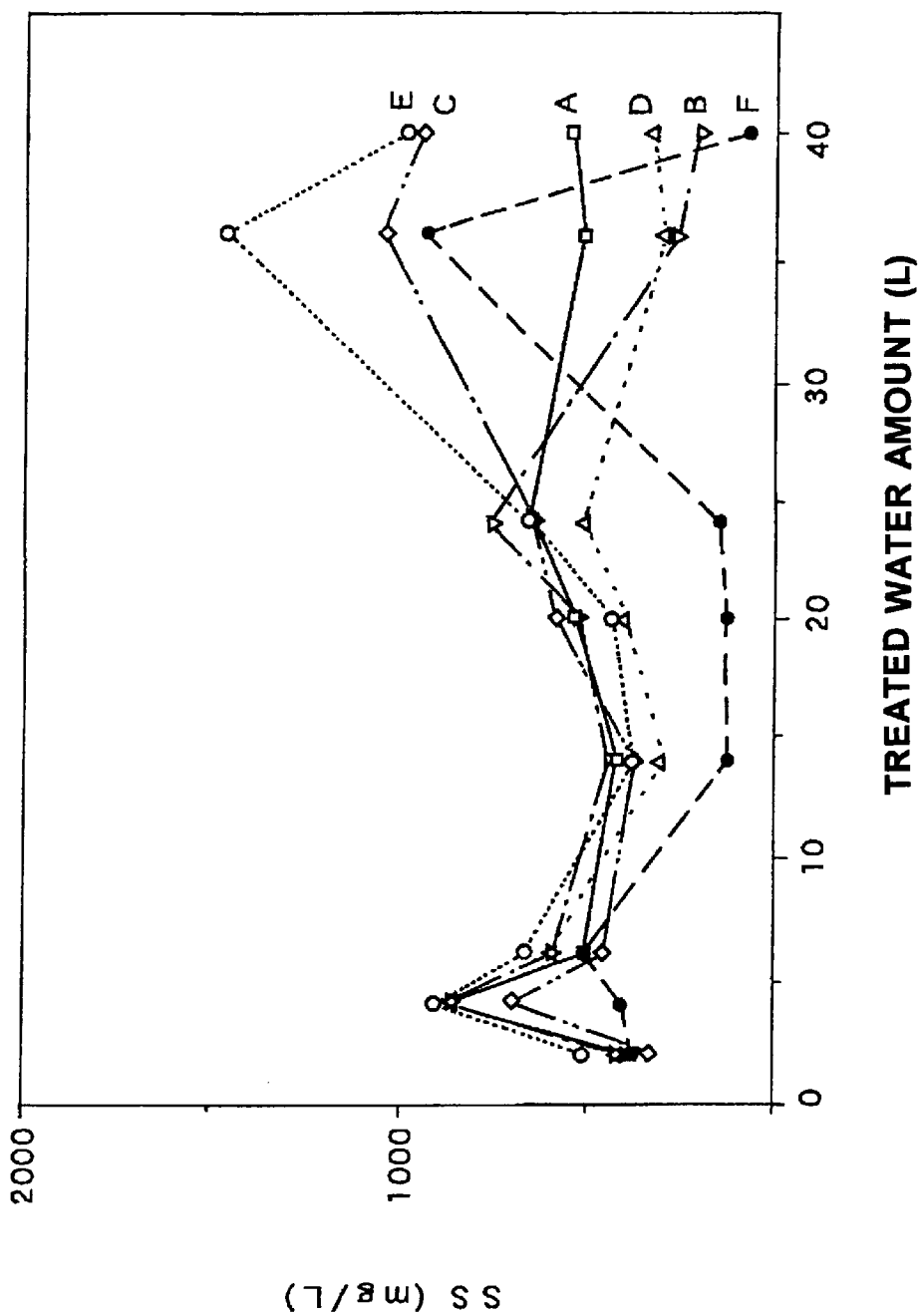
FIG. 8 is a diagram presenting the result of an experiment using various carrier layers (auxiliary layers)

The BOD and SS of the organic-waste-containing water before being poured into the tanks were respectively 3500 mg/L and 2800 mg/L. After 2 L of such water were supplied in the tank 10 every day, the SS of the water discharged from the tank 10 (primary treated water) were changed as shown in FIG. 8.

With tank F, the SS of the primary treated water turned out to be relatively low, such as 100 mg/L, at an early stage of the experiment. A low SS with primary treated water indicated that the tank was clogged more. That is, tank F had been clogged since an early stage of the experiment. Accordingly, the color of wood chips might have been changed from black-brown to yellow-brown, and the wood chips might have been decayed around the bottom of the filling layer.

On the other hand, the SS of tanks C and E remained relatively high, such as 500 to 1000 mg/L, which indicated preferable water passing ability. Decay of wood chips had not yet started.

Tanks A, B, and D were in the middle in terms of SS between tank F and tanks C and E as the SS of treated water discharged from these tanks were around 500 mg/L. It was, however, recognized that clogging was started with these tanks at a later stage of the experiment.

Based on the above, it was known that the existence of a carrier layer (an auxiliary layer) was important in preventing clogging. In particular, foam glass grains made an effective carrier layer (an auxiliary layer) to prevent clogging.

Table 2 shows water quality in terms of SS of primary treated water after supplying crushed-organic-waste-containing waste water into the respective tanks twenty times.

TABLE 2

| Sample | (mg/L) SS |
|---|---|
| Tank A | 540 |
| Tank B | 200 |
| Tank C | 940 |
| Tank D | 320 |
| Tank E | 990 |
| Tank F | 70 |

Tanks C and E maintained relatively high SS, while tank F had relatively low SS due to clogging. As a sign of a drop in SS was observed with tanks A, B, and D, clogging was anticipated also with these tanks as the treating continued.

Experiment 2

Figure 9:
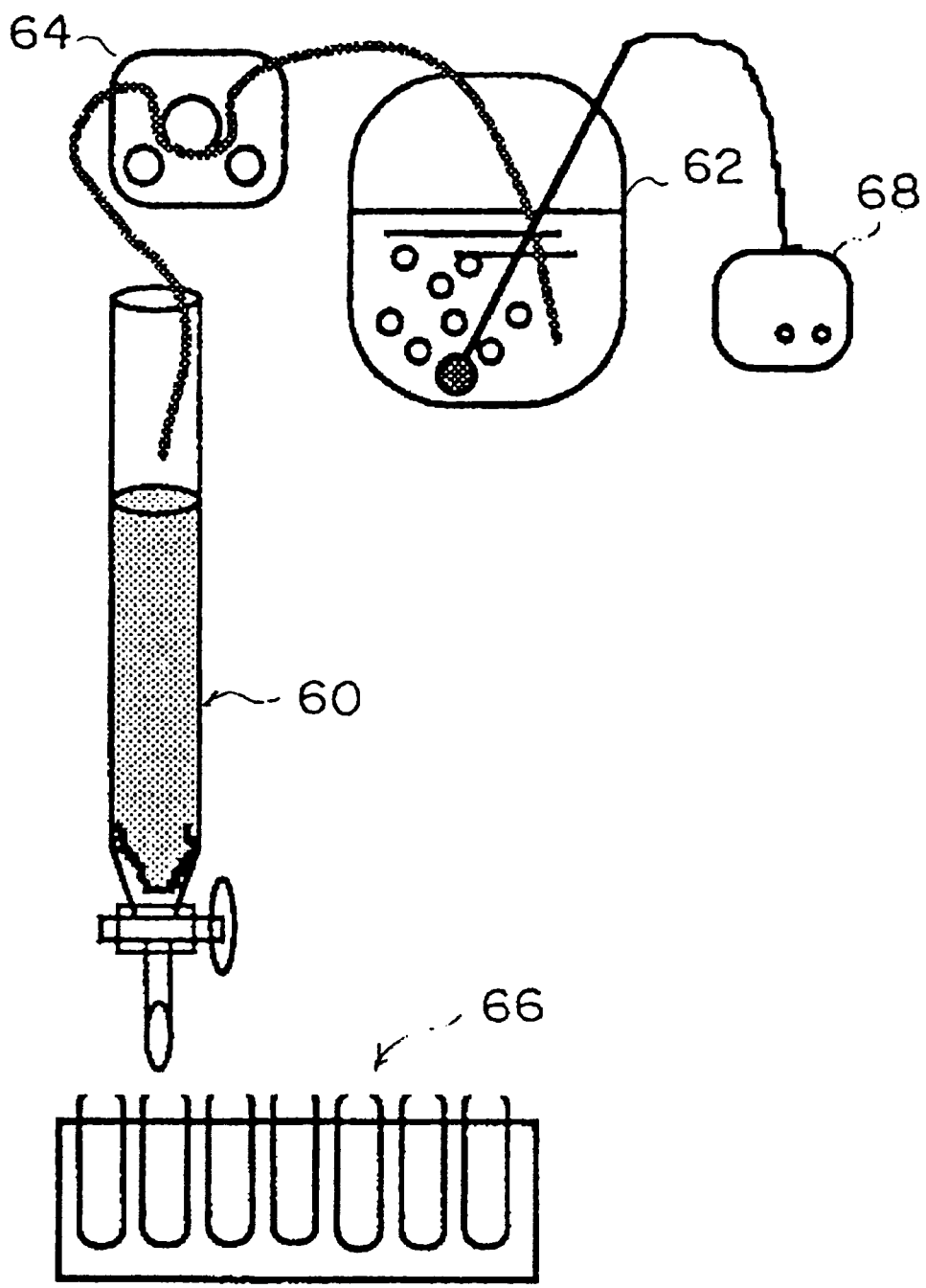
FIG. 9 is a diagram showing a schematic structure of an experimental equipment.

Referring to FIG. 9, a tank of 45 mm in diameter and 345 mm in height was used for a treating tank 60, corresponding to the second treating tank 30, and wood chips were stuffed therein. At first, carrier water (a 0.85% NaCl solution) was poured at 2.05 mL/min into the tank 60 from a carrier water tank 62 via a peristaltic pump 64. Then 5 mL of bouillon culture medium whose COD (chemical oxygen demand using potassium permanganate) was 12,500 mg/L, was stuffed in the treating tank 60. After that the carrier water was poured again. The treated water discharged from the tank 60 was collected by a fraction collector 66 at 3.5 minutes/column, and changes thereof as time passed were observed.

In the first run of the experiment, carrier water was poured into the tank 60 without being aerated. In the second run, on the other hand, carrier water was aerated with air supplied into the carrier water tank 62 via an air pump 68 before being supplied to the tank 60.

Figure 10:
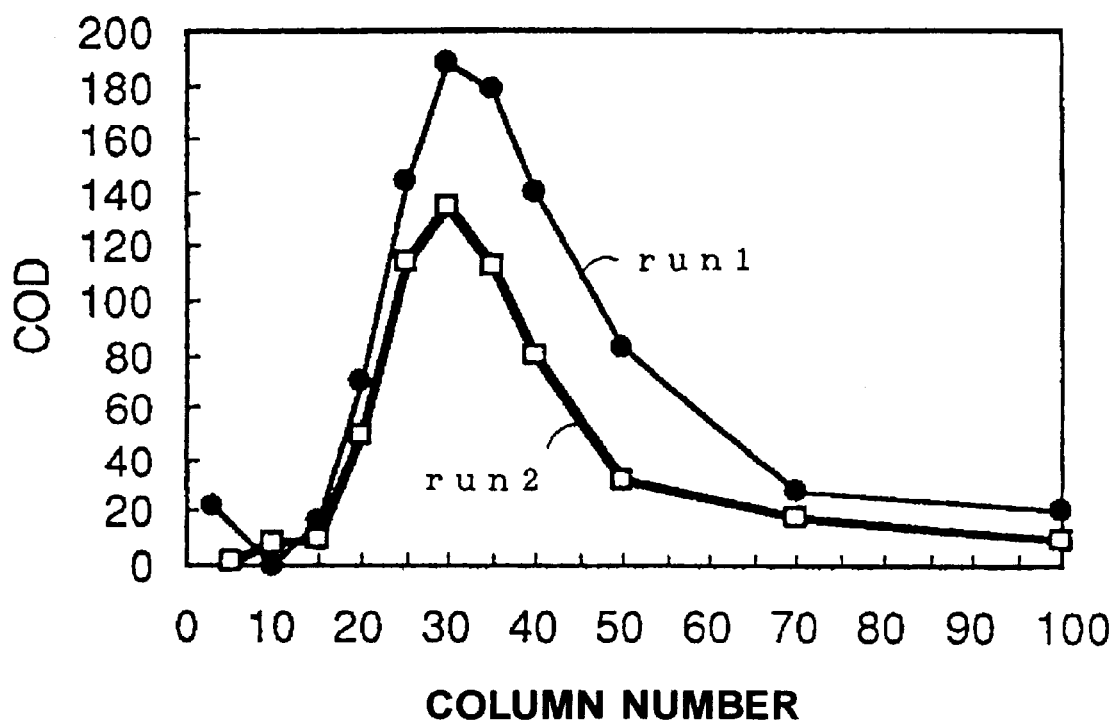
FIG. 10 is a diagram presenting experimental results.

The results of the above experiment are shown in FIG. 10. The COD of the primary treated water peaked at around 190 mg/L in the first run, and at around 140 mg/L in the second run. This proved that aeration treating encouraged COD removal.

Experiment 3

An identical tank to that which was used in the second experiment, was used. Waste water (primary treated water) having BOD 1900 mg/L and SS 300 mg/L, was poured into the tank at 3.5 mL/min for five hours per day, i.e., 1 L per day.

This arrangement stably provided permeated treated water having BOD 450 mg/L and SS 60 mg/L.

Experiment 4

A treating tank of 146 mm in diameter was prepared and used for a treating tank, corresponding to the second treating tank 30. Foam glass grains and wood chips were alternately stuffed into four stages of the tank 30, respectively having a 3 cm thickness and a 5 cm thickness, so that a tank of 500 mm high was formed. A fibrous-structured layer was provided below the lowest foam glass layer. Air was supplied to every foam glass layer from the lateral side thereof. Organic waste-containing waste water identical to that which was used in the third experiment was poured into the tank at 35 mL/min for five hours per day.

This arrangement stably provided permeated treated water having BOD 200 mg/L and SS 50 mg/L.

The above second to fourth experiments proved that the second treating tank 30 of this embodiment enabled preferable treating.

Experiment 5

The system shown in FIG. 1 was used. 1.25 kg of organic waste was crushed by a disposal unit together with 25 L of water to thereby obtain crushed-organic-waste-containing waste water. The thus obtained waste water was poured into the system every day (1.25 kg of organic waste/25 L of water/day). The BOD and SS of the thus obtained water were respectively 3500 mg/L and SS 3300 mg/L.

In addition, two treating tanks having an external size of 35×60 cm were prepared, and each used as a first treating tank 10. 10 kg of wood chips in total were filled in the two tanks (tank 10) to therewith constitute a filling layer 14, wherein 70% of the total wood chips were wood chips with grain diameter 1.7 mm or larger (mainly larger than 2 mm). Foam glass grains were additionally filled in each tank 10. The filling layer 14 has a thickness of approximately 5 cm to 10 cm, while the foam glass layer (an auxiliary layer) 16 has a thickness of approximately 3 cm to 5 cm. Table 3 shows grain size distribution of the wood chips.

TABLE 3

| Grain size (mm) | |
|---|---|
| 0.25 or less | 1.2(%) |
| 0.25 to 0.59 | 2.1 |
| 0.59 to 0.75 | 4.5 |
| 0.75 to 1.2 | 7.5 |
| 1.2 to 1.7 | 10.1 |
| 1.7 and over | 74.3 |

This arrangement stably provided permeated treated water having BOD 2000 mg/L and SS 1000 mg/L for about 130 days.

Figure 11:
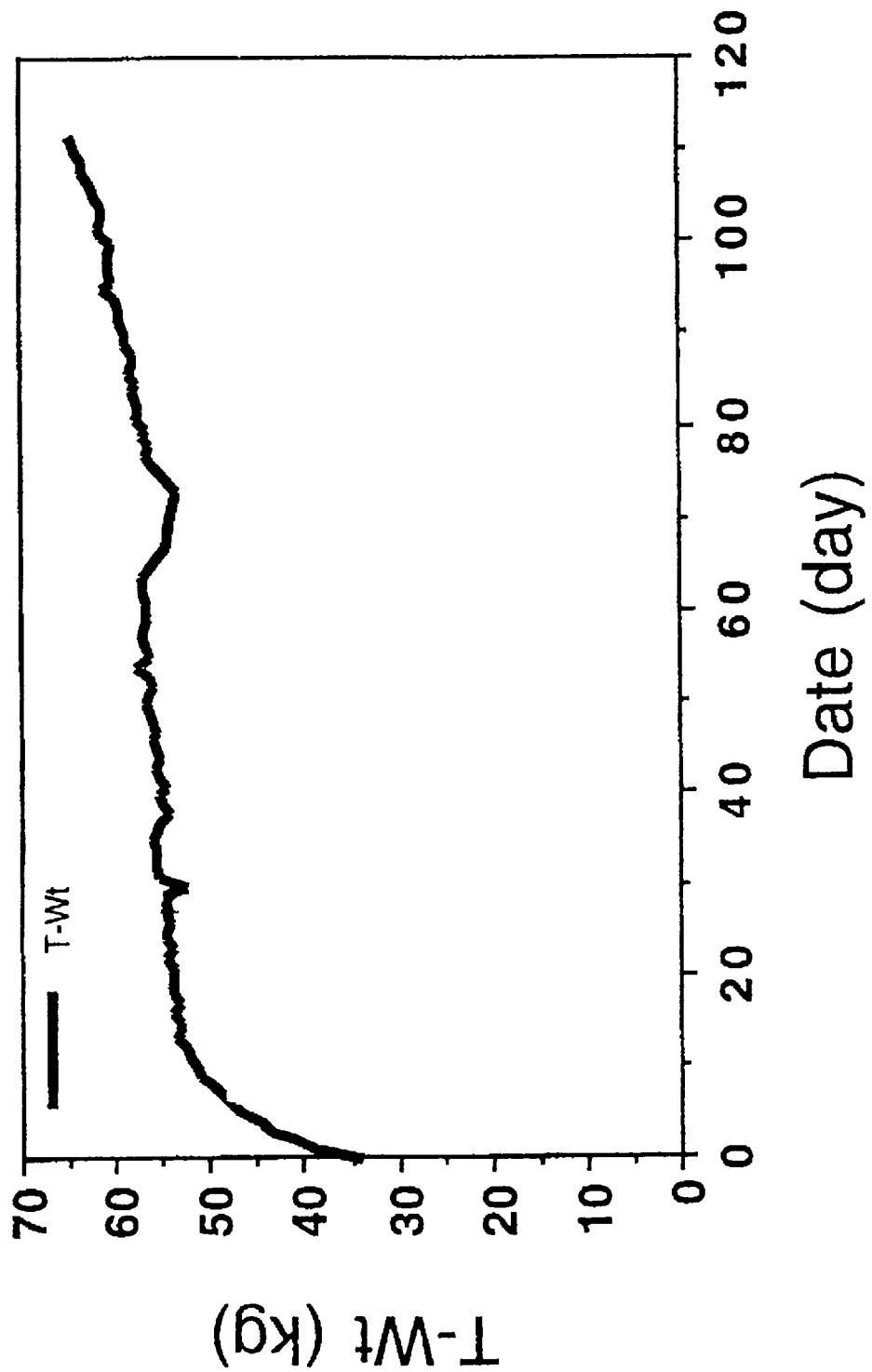
FIG. 11 is a diagram presenting the variation in weight of the first treating tank.

FIG. 11 shows variation of the total weight (T-Wt) of the first treating tank 10. The tank 10 was as heavy as about 35 kg at the start of the experiment, which was changed to be about 52 kg 10 days after the start, further to be about 55 kg 20 days after the start. After becoming slightly heavier in about 100 days, the total weight increased rapidly to be about 65 kg in 110 days after the start of the experiment. From this result, it was known that the tank was usable without clogging for about 100 days under the above condition.

The treated water drained from this first treating tank 10 (primary treated water) was supplied at 60 mL/min to the second treating tank 30 having the following structure. That is, two tanks of 18 cm in diameter, 32 cm in height, and 508 cm$^2$ in total surface were prepared and used as a second treating tank 30. Wood chips having an identical grain distribution to that for the first treating tank 10 were filtered to thereby select only those having a 2 mm or larger grain diameter. The selected wood chips were stuffed in the tanks 30 to therewith form a filling layer 34. A foam glass layer 36 was additionally formed. In this manner, filling layers 34 and foam glass layers 36 each having a 5 cm thickness were formed at three stages inside the tank 30. Air was supplied to the tanks 30 at 60 L/min.

This arrangement stably provided permeated treated water drained from the second treating tank 30 (secondary treated water) having BOD 200 mg/L and SS 50 mg/L for about 70 or more days. Extractive substances in n-hexane were observed as low as an order of a few mg/L.

Based on the above, it was known that the first treating tank 10 and the second treating tank 30 having the above structure enabled treating waste water which contained organic waste crushed by a disposal unit, and to stably provide treated water having BOD 200 mg/L and SS 50 mg/L. Also, the experiment proved that nitrogen was removed during the treating held in the second treating tank 30. Specifically, it was known from the comparison between nitrogen concentration of the water before being supplied to and after being drained from the second treating tank 30, that 38% of nitrogen contained in the supplying water was removed during the treating held inside the second treating tank 30. In other words, the nitrogen removing effect of the apparatus of the present invention was confirmed.

As described above, the organic waste water treating apparatus of the present invention is durable for prolonged use and for preferable treating because primary treated water can smoothly come off a filling layer due to the existence of an auxiliary layer, which can prevent decay and clogging in the filling layer.

Moreover, effective aerobic biological treatment can be achieved when wood chips are used as a microorganism carrier in the filling layer, which is effective in preserving sufficient microorganisms in the filling layer.

Further, BOD and suchlike of the treated water can be sufficiently decreased when primary treated water is filtered by another filling layer made of wood chips or the equivalent materials.

Still further, short-circuiting of permeating water and clogging in layers can be provided when a treating device provided subsequent to the primary treating apparatus, namely, a primary treated water treating apparatus, employs a multiple-layered structure containing one or more pairs of filling layers and auxiliary layers. This ensures effective treating.

Furthermore, aerobic biological treatment can be performed effectively when the treated water is exposed to aeration treating using air supplied to the auxiliary layer of the primary treated waste water treating apparatus.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An organic waste water treating apparatus for treating organic waste water, comprising:
   a treating layer for containing a microorganism carrier for filtering and aerobic-biologically treating waste water supplied and discharging the waste water;
   an auxiliary layer comprising foam glass grains for passing the waste water discharging from the treating layer; and
   a gas supplying member for diffusing oxygen into the treating layer,
   wherein
   the waste water is further discharged through the auxiliary layer.

2. A treating apparatus according to claim 1, wherein: the auxiliary layer has a function for promoting discharging of the waste water from the treating layer.

3. A treating apparatus according to claim 1, wherein: the treating layer has a multiple-layered structure in which a number of treating layers and a number of auxiliary layers are alternately laminated.

4. A treating apparatus according to claim 1, wherein: the auxiliary layer has a multiple-layered structure comprising water passing material and water holding material.

5. A treating apparatus according to claim 1, wherein the auxiliary layer has superior water passing ability to the treating layer.

6. A treating apparatus according to claim 1, wherein: the auxiliary layer comprises a porous member.

7. A treating apparatus according to claim 1, wherein: the auxiliary layer comprises a number of members.

8. A treating apparatus according to claim 1, wherein: the treating layer comprises a porous member.

9. A treating apparatus according to claim 1, wherein: an auxiliary layer at a lowest stage includes at least two layers including a closer layer to the treating layer and a farther layer from the treating layer,
   the farther layer having superior water passing ability to the closer layer.

10. A treating apparatus according to claim 9, wherein: the farther layer has superior water passing ability to the closer layer because the farther layer has a larger space ratio than the closer layer.

11. A treating apparatus according to claim 9, wherein: the farther layer comprises a fibrous-structured layer.

12. A treating apparatus according to claim 1, wherein: an auxiliary layer at a lowest stage is constructed such that a portion thereof farther from the treating layer has a larger space ratio.

13. A treating apparatus according to claim 1, further comprising:
    a secondary treating apparatus for treating the water discharged through the auxiliary layer,
    the second treating apparatus including a treating layer containing a microorganism carrier for contacting the water discharged through the auxiliary layer.

* * * * *